United States Patent [19]

Baugh

[11] 4,408,929
[45] Oct. 11, 1983

[54] LATCHING SYSTEM FOR CONTROL LINES FOR PIPE-LAYING BARGES

[76] Inventor: Hollis A. Baugh, Rte. 1, Box 227, Hempstead, Tex. 77445

[21] Appl. No.: 341,631

[22] Filed: Jan. 22, 1982

[51] Int. Cl.³ .............................................. F16L 1/00
[52] U.S. Cl. .................................. 405/166; 166/338; 166/341; 285/26; 405/169; 405/170
[58] Field of Search ....................... 405/166, 168–171, 405/158, 165; 166/138–146; 285/18, 26, 29, DIG. 21

[56] References Cited

U.S. PATENT DOCUMENTS

| | | | |
|---|---|---|---|
| 3,246,919 | 4/1966 | Todd | 166/340 X |
| 3,280,571 | 10/1966 | Hauber et al. | 405/166 |
| 3,486,556 | 12/1969 | Burgess | 166/338 |
| 3,517,737 | 6/1970 | Petersen | 166/340 X |
| 3,542,125 | 11/1970 | Sizer | 166/340 |
| 3,620,028 | 11/1971 | Wilde | 405/166 |
| 3,704,596 | 12/1972 | Lloyd | 405/166 |
| 3,722,585 | 3/1973 | Nelson et al. | 166/341 X |
| 4,097,069 | 6/1978 | Morrill | 166/344 X |

Primary Examiner—Dennis L. Taylor
Attorney, Agent, or Firm—Ben D. Tobor

[57] ABSTRACT

A latching system for releasably connecting two conduits which includes a base member having at least one upwardly extending conduit and a locking plate supported thereon, and a latch support member including at least one downwardly extending conduit and having a locking mandrel depending therefrom. The locking mandrel is rotated via the downward movement of a piston within a cylinder, the piston having a spirally splined shaft mounted thereon which mates with a spirally splined surface associated with the locking mandrel, whereby downward movement of the piston and spirally splined shaft causes the locking mandrel to rotate and lock into engagement with the locking plate.

21 Claims, 8 Drawing Figures

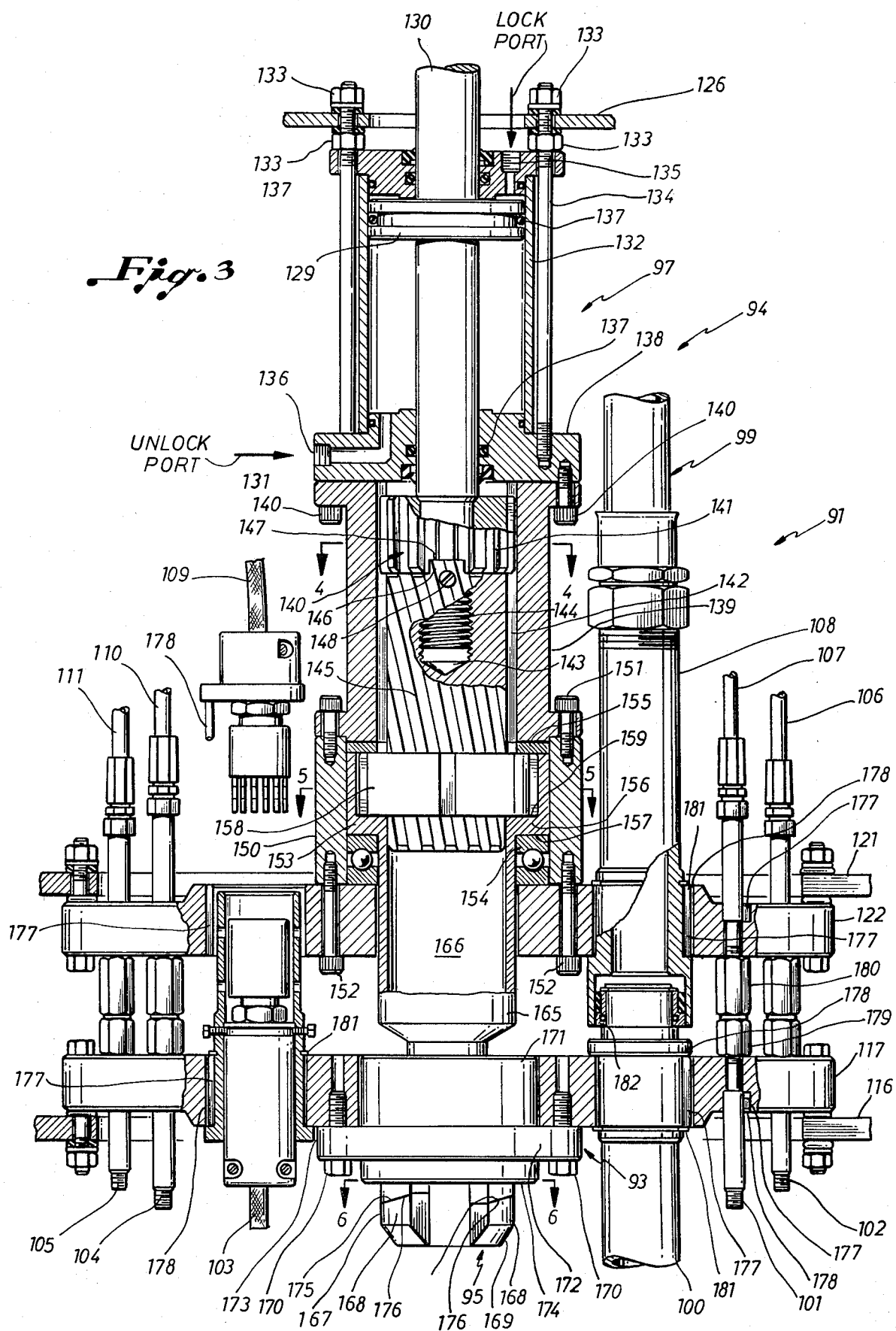

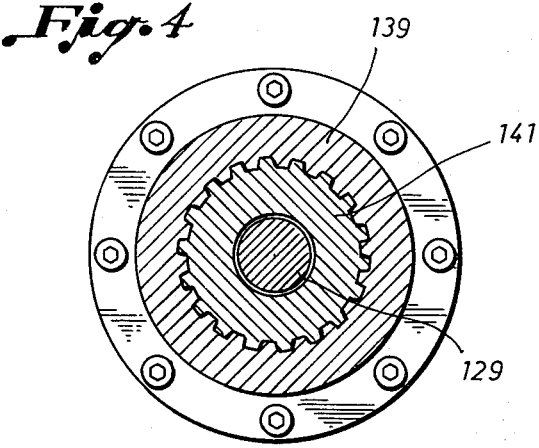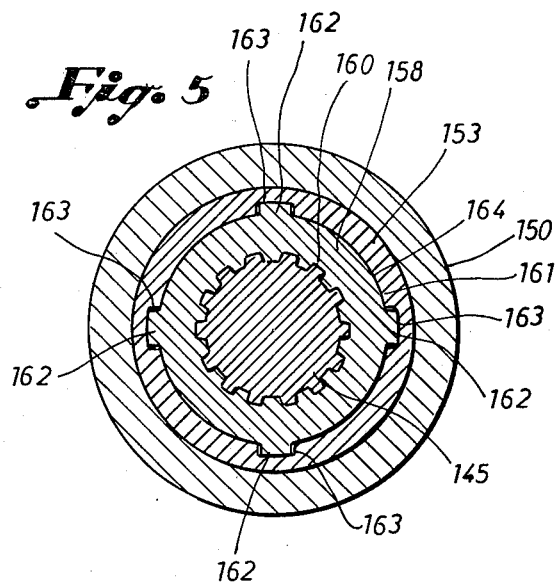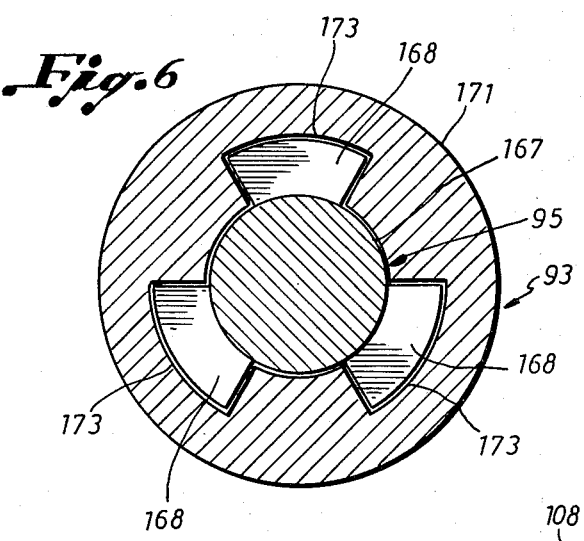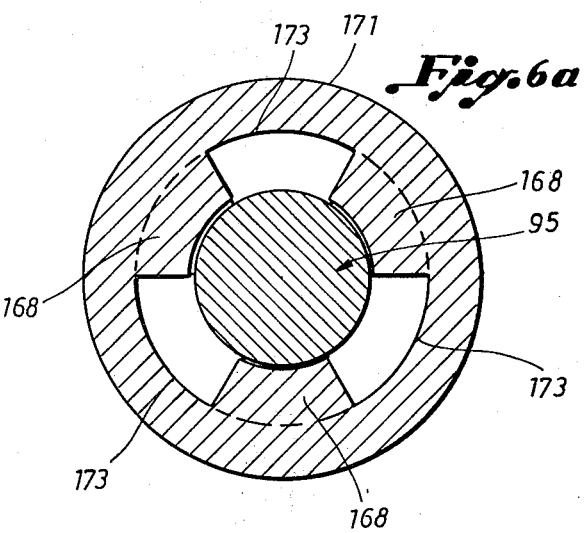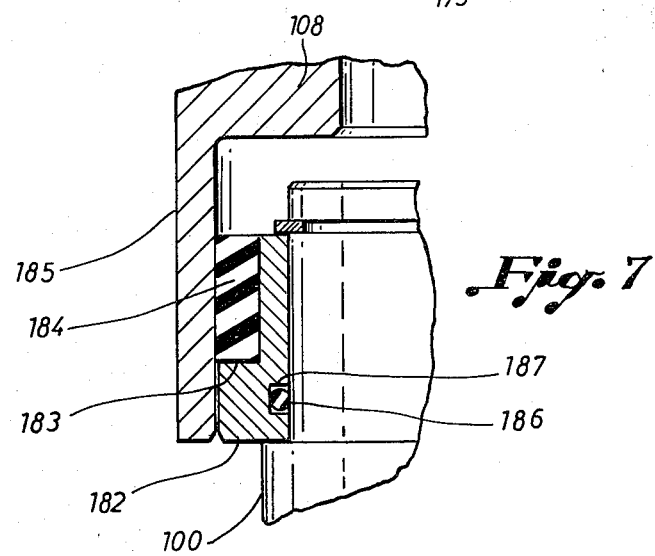

LATCHING SYSTEM FOR CONTROL LINES FOR PIPE-LAYING BARGES

FIELD OF THE INVENTION

The invention relates to a latching system for releasably connecting control lines, particularly fluid and electrical control lines, used with pipe-laying barges.

DESCRIPTION OF THE PRIOR ART

In connection with the laying of pipe under bodies of water, it is necessary to use a pipe-laying stinger, which is normally pivotably connected to the rear of the pipe-laying barge. Conventional control lines, including electrical, hydraulic, air, and water lines, are suspended from a hose roller sheave mounted on the pipe-laying barge. These control lines, or hoses, pass from the pipe-laying barge and are connected to the pipe-laying stinger, so that the equipment disposed on the pipe-laying stinger may be remotely operated from the pipe-laying barge. In the event of inclement weather, or other emergency conditions, it is necessary to disconnect the control lines, or hoses, from the pipe-laying stinger. In the past, it has been necessary to send a workman from the barge to the stinger to manually disconnect the control lines—a particularly dangerous task during foul weather or other emergency conditions. Thus, in some instances, to avoid the loss of life, it is necessary to chop the control hoses in order to disconnect them from the pipe-laying stinger. Such an action is of course costly and inefficient.

Accordingly, prior to the development of the present invention, there has been no latching system for releasably connecting control lines, or conduits, to a pipe-laying stinger which can be remotely disconnected from the stinger in a safe, efficient, and inexpensive manner.

Therefore, the art has sought a latching system for use with pipe-laying stingers which is safe, efficient, inexpensive, and is remotely and hydraulically operated.

SUMMARY OF THE INVENTION

In accordance with the invention, the foregoing has been achieved through the present latching system for releasably connecting at least two conduits. The latching system of the present invention for releasably connecting at least two conduits includes: a base member having at least one upwardly extending conduit and a locking plate supported thereon; a latch support member including at least one downwardly extending conduit and having a locking mandrel extending therefrom; means for moving the locking mandrel downwardly through the locking plate; and means for rotating in a first direction the locking mandrel into locking engagement with the locking plate, whereby the at least two conduits are releasably connected by the engagement of the locking mandrel with the locking plate.

A feature of the latching system of the present invention resides in the fact that the rotation means is mounted on the latch support member and the rotation means comprises: a piston having upper and lower ends, and a hydraulic cylinder mounted on the latch support member; the piston being operatively associated with the locking mandrel, whereby upon selective actuation of the piston within the cylinder, the locking mandrel is either rotated in a first direction into engagement with the locking plate or is rotated in a second direction ou of engagement with the locking plate.

Another feature of the latching system of the present invention is that the ends of the piston include guide means comprising a straight splined shaft and a mating straight splined surface, whereby upon movement of the piston, undesired rotational movement of the locking mandrel is prevented by the straight splined shaft and the mating straight splined surface. The straight splined shaft may be disposed at the lower end of the piston, and an emergency disconnect means is disposed at the upper end of the piston, whereby upon a failure associated with the hydraulic cylinder occurring, the emergency disconnect means may be remotely activated to move the piston upwardly to rotate the locking mandrel out of engagement with the locking plate.

A further feature of the latching system of the present invention is that the means for rotating the locking mandrel further comprises a spirally splined shaft and a mating splined surface operatively associated with the locking mandrel, whereby movement of the spirally splined shaft rotates the mating splined surface and locking mandrel. The spirally splined surface may comprise a ring, having spiral splines on its interior surface, secured to the locking mandrel. The spirally splined shaft may be secured to the lower end of the piston, whereby upon downward movement of the piston, the spirally splined shaft also moves downwardly and rotates the mating spirally splined surface and locking mandrel.

When used with the pipe-laying stinger, the latching system of the present invention is a part of a pipe-laying stinger assembly for use with a pipe-laying barge, and includes: an elongate support member, adapted to be attached to the barge, and having a plurality of rollers thereon for supporting a length of pipe; mounting member secured to the support member; a base member having at least one upwardly extending conduit and a locking plate supported thereon, the conduit adapted for containing fluid or electrical control lines, and the base member being secured to the mounting member; a latch support member including at least one downwardly extending conduit and having a locking mandrel depending therefrom, the conduit being adapted to be connected to the pipe-laying barge; means for moving the locking mandrel downwardly through the locking plate; and means for rotating in a first direction the locking mandrel into locking engagement with the locking plate, said means for rotating being mounted on the latch support member, whereby the at least two conduits are releasably connected by the engagement of the locking mandrel with the locking plate.

The latching system of the present invention, when compared with previously proposed prior art manual disconnection procedures, has the advantages of: efficiency, ease of use; reliability; safety; and permits the latching system to be remotely and hydraulically disconnected.

BRIEF DESCRIPTION OF THE DRAWINGS

In the drawings

FIG. 3 is an enlarged partial cross-sectional view of a portion of a latching system in accordance with the present invention;

FIG. 4 is a cross-sectional view of a latching system in accordance with the present invention taken along line 4—4 in FIG. 3;

FIG. 5 is a cross-sectional view of a latching system in accordance with the present invention taken along line 5—5 in FIG. 3;

FIG. 6 is a cross-sectional view of a latching system in accordance with the present invention in an unlocked position taken along line 6—6 in FIG. 3;

FIG. 6a is a cross-sectional view of a latching system in accordance with the present invention in a locked position; and FIG. 7 is an exploded partial cross-sectional view of a portion of a latching system in accordance with the present invention as indicated in FIG. 3.

While the invention will be described in connection with the preferred embodiment, it will be understood that it is not intended to limit the invention to that embodiment. On the contrary, it is intended to cover all alternatives, modifications, and equivalents as may be included in the spirit and scope of the invention as defined by the appended claims.

DETAILED DESCRIPTION OF THE INVENTION

Figure 1:
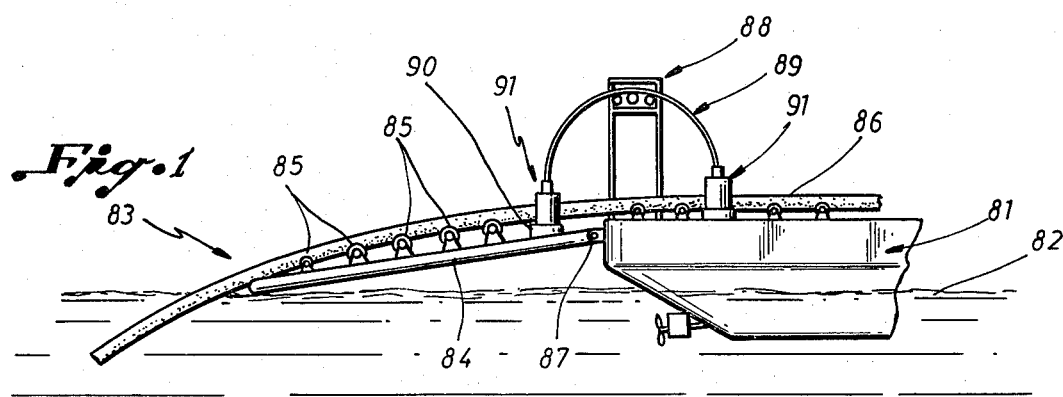
FIG. 1 is a plan view of a typical pipe-laying barge and pipe-laying stinger provided with a latching system in accordance with the present invention.

With reference to FIGS. 1-7, the latching system, in accordance with the present invention, will be described. In FIG. 1 a conventional pipe-laying barge 81 is shown disposed in a body of water 82. Barge 81 has a conventional pipe-laying stinger 83 attached to the rear of barge 81. Stinger 83 includes an elongate support member 84 having a plurality of rollers 85 thereon for supporting the length of pipe 86 which is being laid in the body of water 82. Preferably stinger 83 is attached to barge 81 by a suitable, pivotal connection 87.

With reference to FIG. 1, it is seen that barge 81 has a conventional hose roller sheave assembly 88 mounted at the rear of barge 81. Hose roller sheave assembly 88 supports at least one or more control lines, or hoses, 89 which pass from barge 81 to stinger 83. It is typical for the control hose, or conduit, 89 to comprise a hydraulic imbilical hose having a 12-inch diameter, as well as having air and/or water lines (not shown in FIG. 1) which may be of a two-inch diameter also suspended from hose roller sheave assembly 88. The control hoses, or conduits, 89 provide hydraulic fluid, electricity, air, and/or water to stinger 83 in order to operate the various types of conventional equipment disposed on stinger 83. Stinger 83 includes any suitable mounting member 90 on which latching system 91 of the present invention is secured. As shown in FIG. 1, stinger 83 is provided with a latching system 91, to be hereinafter described, and barge 81 is also provided with a latching system 91.

Figure 2:
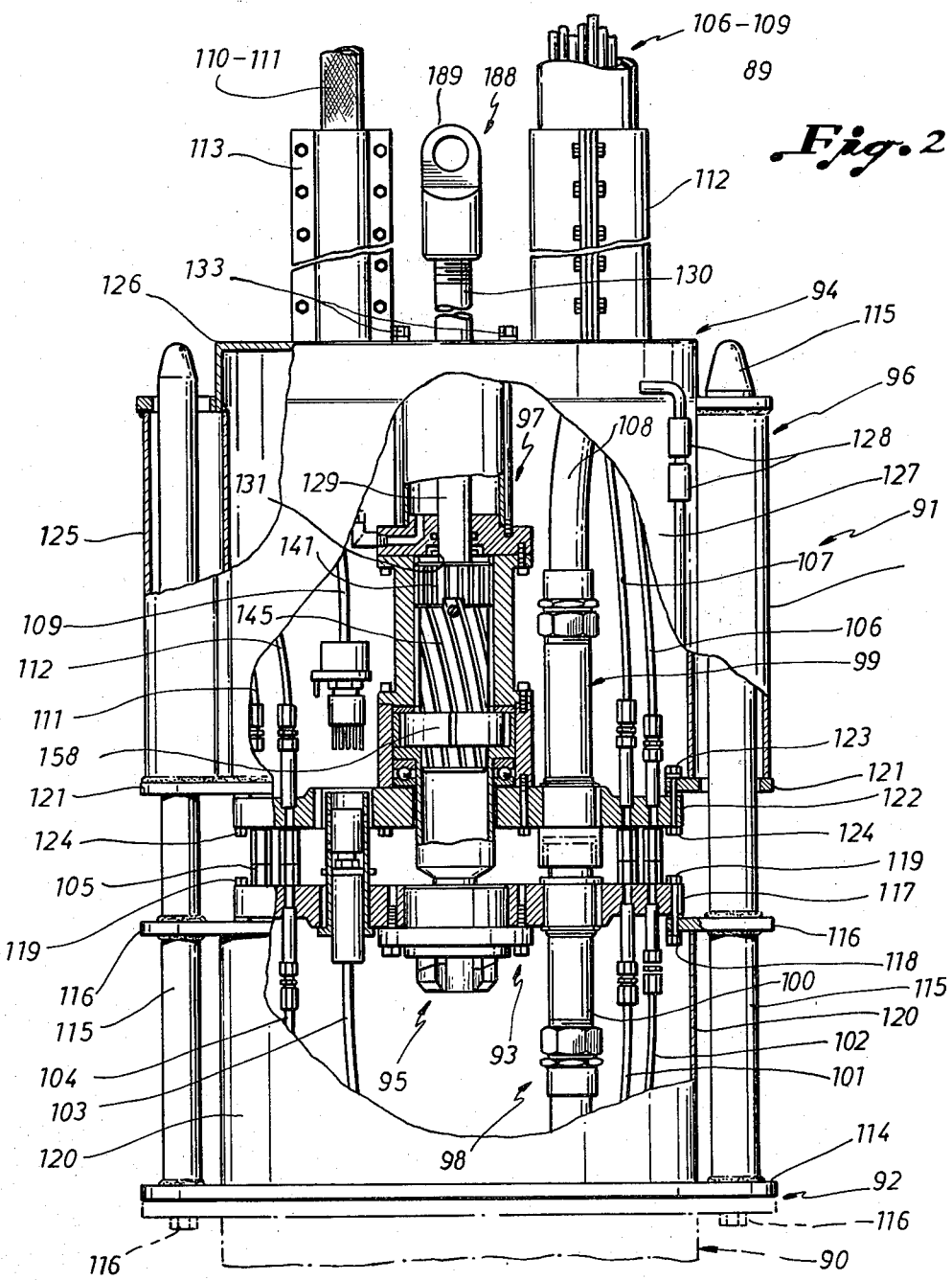
FIG. 2 is a partial cross-sectional view of a latching system in accordance with the present invention.

With reference now to FIG. 2, latching system 91 will be described in greater detail. Latching system 91 generally comprises: a base member 92; a locking plate 93 supported on base member 92; a latch support member 94 having a locking mandrel 95 depending therefrom; means for moving 96 locking mandrel 95 downwardly through locking plate 93; and means for rotating 97 in a first direction the locking mandrel 95 into locking engagement with locking plate 93.

Still with reference to FIG. 2, it is seen that at least one upwardly extending conduit 98 is mounted on base member 92, and at least one downwardly extending conduit 99 is mounted on latch support member 94. Preferably, base member 92 has a plurality of conduits, or control lines, extending upwardly therefrom, such as: main hydraulic line 100, auxiliary hydraulic lines 101 and 102; electrical control line, 103; air line 104; and water line 105. Likewise, depending from latch support member 94 are corresponding and mating control lines 106, 107, 108, 109, 110 and 111. The various conduits, or control lines, 106-111 depending from latch support member 94 run from barge 81 through the hydraulic umbilical hose 89, which umbilical cord 89 is clamped to the top of latch support member 94 by any suitable clamp, such as that shown at 112. Additionally, air and/or water lines 109-110 also run from barge 81 over hose sheave assembly 88 to latch support member 94 and are clamped thereto by any suitable clamp, such as that shown at 113. It is of course understood that the number of control lines, or conduits, which run from barge 81 to latching system 91 is dependent upon the types of controls and equipment (not shown) mounted on pipe-laying stinger 83, and the number of such control lines, or hoses, may be varied to meet the particular requirements of a given pipe-laying stinger. Hydraulic imbilical hose 89 also includes hydraulic lines for the control of the rotation means 97 as will be hereinafter described in greater detail.

Still with reference to FIG. 2, some of the components of the latching system 91 of the present invention will be further described in greater detail. Base support member 92 is preferably a plate member 114 having a plurality of upwardly extending elongate guide shafts 115 secured in any conventional manner, such as by welding. It is seen that plate member 114 is secured to mounting member 90 disposed on stinger 83 as by suitable bolts 116. Disposed and secured intermediate the ends of guide shafts 115 is a horizontal support ring 116 which has a conduit and locking plate support plate 117 secured thereto, as by suitable nuts and bolts 118 and 119. Base member 92 may also include a base housing 120 disposed between base plate 114 and horizontal support ring 116.

As seen in FIG. 2, latch support member 94 includes a horizontal support ring 121 which has a conduit and locking mandrel support plate 122 secured thereto as by a plurality of nuts and bolts 123 and 124. The means for rotating 97 locking mandrel 95 is supported by plate 122 and secured thereto, as will be hereinafter described in greater detail with reference to FIG. 3. Latch support member 94 also includes a plurality of guide tubes 125 adapted to cooperate with guide shafts 115, which guide tubes 125 serve to align latch support member 94 as it is lowered and moved downwardly along guide shafts 115. Thus, guide tubes 125 serve as a means for moving 96 locking mandrel 95 downwardly through locking plate 93 disposed upon base member 92. Latch support member 94 may also include a housing 126 through which access is obtained via an access door 127 which is supported by hinge pins 128.

Turning now to FIG. 3, the means for rotating 97 locking mandrel 95 and related components will be described in greater detail. The means for rotating 97 locking mandrel 95 is seen to comprise a piston 129 having upper and lower ends 130 and 131 disposed within a hydraulic cylinder 132 mounted on the latch support member 94. Any suitable connection such as nuts and bolts 133 and 134 may be used to suspend hydraulic cylinder 132 from the housing 126 of latch support member 94. Cylinder 132 is provided with two conventional hydraulic fluid inlet ports 135 and 136. Suitable hydraulic lines (not shown) are provided for the entry and exit of hydraulic fluid through ports 135 and 136. Such hydraulic lines would normally be contained within hydraulic imbilical hose 89, or alternatively may run separately from suitable hydraulic controls and a hydraulic reservoir disposed on barge 81. Piston 129 and hydraulic cylinder 132 are provided with a plurality of conventional O-rings 137 to prevent leakage of hydraulic fluid from cylinder 132. Depending from the base 138 of cylinder 132 is a tubular guide member 139, which is supported by a plurality of bolts 140 secured to cylinder base 138. Secured to the lower end 131 of piston 129 is a guide means 140, which preferably is a straight splined shaft 141 which cooperates with a plurality of straight splines 142 formed on the interior surface of tubular guide 139. Guide means 140, upon movement of piston 129, prevents undesired rotational movement and keeps the other components of latching system 91 in proper alignment as will be hereinafter described. Although guide means 140 is preferably disposed at the lower end 131 of piston 129, it should be readily apparent to those skilled in the art, that guide means 140 could be disposed toward the upper end 130 of piston 129. The lowermost portion 143 of piston 129 is threaded as at 144 so that piston 129 may be secured to a spirally splined shaft 145.

Still with reference to FIG. 3, it is noted that spirally splined shaft 145 is provided with a key 146 which mates with a keyway 147 disposed in straight splined shaft 141, and a lock screw 148 may be provided to further secure spirally splined shaft 145 to piston 129. With reference to FIG. 4, the spatial relationship between straight splined shaft 141, tubular guide 139 and piston 129 is clearly seen.

Still with reference to FIG. 3, it is seen that disposed between the lower end of tubular guide 139 and conduit and locking mandrel support plate 122 is a ring housing 150 secured in place by a plurality of bolts 151 and 152. Disposed within ring housing 150 is: the upper portion 153 of locking mandrel 95; bearing 154; and a thrust bearing ring 155. The upper portion 153 of locking mandrel 95 has an annular shoulder 156 whose lower surface rests upon bearing 154 and a ring 158 rests upon the upper surface 159 of shoulder 156 and below thrust bearing ring 155. With reference to FIGS. 3 and 5, it is seen that ring 158 has a spirally splined surface 160 on its interior, which spirally splined surface 160 mates with the spirally splined outer surface of spirally splined shaft 145. The outer surface 161 of ring 158 has at least one, and preferably four vertical keys 162 which are received by and mate with four corresponding keyways 163 formed in the interior surface 164 of the upper portion 153 of locking mandrel 95.

Returning to FIG. 3, it is seen that the intermediate portion 165 of locking mandrel 95 has a tubular cross-section, whereby a tubular space 166 is provided into which spirally splined shaft 145 may enter as will be hereinafter described. The lower end 167 of locking mandrel 95 has at least one, and preferably three, locking wedge members 168 as is also shown in FIG. 6. The lower end 167 of locking mandrel 95 may preferably have a tapered surface 169 to facilitate the passing of locking mandrel 95 through locking plate 93 as will be hereinafter described.

Depending from conduit and locking plate support plate 117 are a plurality of threaded bolts 170 which retain locking plate 93 beneath and within conduit and locking plate support plate 117. With reference to FIGS. 3 and 6, it is seen that locking plate 93 may preferably be a circular member 171 having an exterior, radial shoulder 172 formed thereon, which shoulder 172 is received within a corresponding radial groove 173 formed in the lower surface of conduit and locking plate support plate 117. The interior surface of locking plate 93 has at least one, and preferably three, longitudinal grooves 173 which correspond and mate with the locking wedge members 168 of locking mandrel 95. When locking mandrel 95 is in the position shown in FIG. 6, locking mandrel 95 has just passed through locking plate 171 and FIG. 6 represents the unlocked position.

With reference to FIG. 3, it is seen that the lower surface 174 of locking plate 93 has at least one, and preferably three, wedge-like protrusions, or ramps, 175 which have an inclined surface which corresponds and mates with a tapered surface 176 at the top of locking wedge members 168 of locking mandrel 95. In FIGS. 3 and 6a, locking mandrel 95 is shown in its locked position with respect to locking plate 93, which occurs after locking mandrel 95 has been rotated about 60° and the upper surfaces 176 of locking wedge members 168 are in contact with the wedge surfaces 175 of locking plate 93.

With reference to FIG. 3, it is seen that each of the conduits 100-105 supported by conduit and locking plate support plate 117, and conduits 106-111 supported by conduit and locking mandrel support plate 122 are received within their respective support plates 117 and 122 via keys 177 and corresponding keyways 178 formed in each of the conduits' respective support plates 117 and 122. These keys 177 and keyways 178 permit the insertion, assembly, and alignment of the conduits within their respective support plates, and eliminated the necessity to use a backup wrench when securing the conduits to the support plates as by connecting nuts 179 and 180 with respect to conduits 101 and 107. Nuts 179 and 180 in addition to securing conduits 101 and 107 to their respective support plate members 117 and 122, also have conventional snap connectors formed therein. Accordingly, upon conduits 101 and 107 being moved towards one another in an aligned and mating relationship, as shown in FIG. 3, a fluid tight seal is formed between conduits 101 and 107. The snap connectors of nuts 179 and 180 do not have any locking mechanism, whereby upon movement of conduits or hoses 101 and 107 away from one another, the connection between conduits 101 and 107 is released.

With regard to the securing of electrical conduit 103 and the main hydraulic conduits 100 and 108, these conduits are secured within their respective support plates 117 and 122 by keys 177, keyways 178, and conventional snap rings 181.

It should of course be readily understood by anyone skilled in the art that although the use of keys 177 and keyways 178 is preferred, other types of means for securing the conduits within their respective support plates may be utilized.

With respect to the main hydraulic conduits 100 and 108, as seen in FIGS. 3 and 7, a seal is provided between conduits 100 and 108 by the use of an annular ring 182 mounted on the upper end of conduit 100. Annular ring 182 has an annular shoulder 183 formed thereon which supports a thermoplastic sealing ring 184 which is bonded to ring 182. Seal 184 contacts the annular lower portion 185 of main hydraulic conduit 108, and in combination with an O-ring 86 disposed in a group 187 in the interior surface or ring 182, provide a fluid tight seal between hydraulic conduits 100 and 108.

With reference now to FIGS. 2 and 3, the operation of the latching system of the present invention will be described. As latching support member 94 is moved and lowered upon base member 92, whereby guide tubes 125 pass over guide shafts 115, locking mandrel 95 will pass through locking plate 93. Such movement may be accomplished by: lowering latch support member by a crane; or having it suspended from the 12-inch main hydraulic umbilical hose 89 and then manually guiding latch support member 94 until guide tubes 125 are properly aligned with guide shafts 115; or in any other suitable manner. Prior to such operation, it is of course understood that umbilical hose 89 has been previously secured to latch support member 94 as by clamp 112.

Because of guide shafts 115 and the entrance of locking mandrel 95 through locking plate 93, all of the conduits 106-111 of latch support member 94 would be aligned and registered with their respective counterpart conduits 100-105. Thus, upon the various connectors, such as nuts 179 and 180 contacting one another, latch support member 94 will be resting upon the components of base member 92, and all of the conduits will be in a sealed and abutting relationship with one another.

It is then necessary to securely latch the latch support member 94 to base member 92, and this is accomplished by first pumping hydraulic fluid through inlet port 135 of hydraulic cylinder 132. The hydraulic fluid then acts upon piston 129 causing piston 129 to move downwardly toward base member 92. Downward movement of piston 129 in turn causes spirally splined shaft 145, which is secured to piston 129, to also move downwardly toward base member 92. As spirally splined shaft 145 moves downwardly, it cooperates with the mating spirally splined surface formed on the interior surface of ring 158 which causes ring 158 to rotate. Since spirally splined ring 158 is fixed with respect to locking mandrel 95 by the key and keyway connections 162 and 163 between locking mandrel 95 and ring 58, the downward movement of spirally splined shaft 145 causes ring 158 and locking mandrel 95 to rotate until locking mandrel 95 is in the position shown in FIG. 6a. Thus, the wedge locking members 168 of locking mandrel 95 are rotated approximately 60° to secure the latch support member 94 to the locking plate 93 of base member 92.

It should of course be understood that although spirally splined shaft 145 cooperates with the mating spirally splined surface formed on the interior of ring 158 in order to provide rotational movement to locking mandrel 95, alternatively a spirally splined surface could be provided on the interior surface of the intermediate portion 165 of locking mandrel 95.

It should also be noted that straight splined shaft 141 in connection with key 146 of spirally splined shaft 145 and keyway 147 of straight splined shaft 141 serves to properly ensure that the proper orientation between spirally splined shaft 145 and spirally splined ring 158 is maintained. Thus, the lower end of locking mandrel 95 will be properly oriented to initially pass through locking plate 93 and then thereafter, upon downward movement of piston 129 and the resultant downward movement of guide mean 140 and spirally splined shaft 145, locking mandrel 95 will be properly rotated into the position shown in FIG. 6a.

Should it become necessary to unlatch latch support member 94 from base member 92, to disconnect all of the conduits 106-111 from their respective mating conduits 100-105 hydraulic fluid from barge 81 is pumped into inlet port 136 of hydraulic cylinder 132 and the resultant fluid pressure thus causes piston 129 to move upwardly. The upward movement of piston 129 in turn raises spirally splined shaft 145. The rotation of spirally splined shaft 145 through spirally splined ring 158 thus causes locking mandrel 95 to rotate in a second direction which thus rotates locking mandrel 95 into the position shown in FIG. 6. Then, latch support member 94 may be pulled away from base member 92 to barge 81.

In the event of a hydraulic failure, or any other type of problem associated with the latching system 91 of the present invention and with reference to FIG. 2, it is seen that the upper end 130 of piston 129 is provided with an emergency disconnect means 188. Preferably, emergency disconnect means 188 is an eye-shaped member 187 which is threadedly secured to the upper end 130 of piston 129. A suitable cable (not shown) extends from the eye-shaped member 187 back to the barge 81. Thus, in an emergency condition, all that is necessary to disengage locking mandrel 95 from locking plate 93 is to apply an upward force to emergency disconnect means 188 which in turn moves piston 129, spirally splined shaft 145 and locking mandrel 95 as has been previously described.

When the latching system 91 of the present invention is used in combination with a pipe-laying stinger 83, a pipe-laying stinger assembly is formed which operates in the manner previously described. Preferably, a latching system 91 in accordance with the present invention may also be used on barge 81, but such use of a second latching system 91 is not necessary.

It is to be understood that the invention is not limited to the exact details of construction, operation, exact materials, or embodiments shown and described, as obvious modifications and equivalents will be apparent to one skilled in the art; for example, the conduit and mandrel support plate could be disposed above its corresponding support ring, as well as having the conduit and latch plate support plate being disposed below its corresponding support ring. Accordingly, the invention is therefore to be limited only by the scope of the appended claims.

I claim:

1. A latching system for releasably connecting at least two conduits, comprising:
   a base member having at least one upwardly extending conduit and a locking plate supported thereon;
   a latching support member including at least one downwardly extending conduit and having a locking mandrel depending therefrom;
   means for moving said locking mandrel downwardly through said locking plate; and
   means for rotating in a first direction said locking mandrel into locking engagement with said locking plate, whereby the at least two conduits are releasably connected by the engagement of the locking mandrel with the locking plate.

2. The latching system of claim 1, wherein said rotation means is mounted on the latch support member.

3. The latching system of claim 1, wherein the means for rotating the locking mandrel comprises a piston, having upper and lower ends, and a hydraulic cylinder mounted on the latch support member, the piston being operatively associated with the locking mandrel, whereby upon selective actuation of said piston within the cylinder, the locking mandrel is either rotated in a first direction into engagement with the locking plate or rotated in a second direction out of engagement with the locking plate.

4. The latching system of claim 3, wherein one of the ends of the piston includes guide means comprising a straight splined shaft and a mating straight splined surface, whereby upon movement of the piston, undesired rotational movement of the locking mandrel is prevented by the straight splined shaft and the mating straight splined surface.

5. The latching system of claim 4, wherein the straight splined shaft is disposed at the lower end of the piston, and an emergency disconnect means is disposed at the upper end of the piston, whereby upon a failure associated with the hydraulic cylinder occurring, the emergency disconnect means may be remotely activated to move the piston upwardly to rotate the locking mandrel out of engagement with the locking plate.

6. The latching system of claim 3, wherein the means for rotating the locking mandrel further comprises a spirally splined shaft and a mating spirally splined surface operatively associated with the locking mandrel, whereby movement of the spirally splined shaft rotates the mating splined surface and locking mandrel.

7. The latching system of claim 6, wherein the spirally splined surface comprises a ring, having spiral splines on its interior surface, secured to the locking mandrel.

8. The latching system of claim 7, wherein the ring is secured to the locking mandrel by at least one key which mates with at least one keyway disposed on the locking mandrel.

9. The latching system of claim 6, wherein the spirally splined shaft is secured to the lower end of the piston, whereby upon downward movement of the piston, the spirally splined shaft also moves downwardly and rotates the mating spirally splined surface and the locking mandrel.

10. The latching system of claim 9, wherein the spirally splined surface comprises a ring secured to the locking mandrel, the ring having spiral splines on its interior surface.

11. The latching system of claim 1, wherein said at least two conduits have at least one key which mates with a corresponding keyway for aligning the conduits in the base member and in the latch support member, which key and keyway prevent rotational movement of the conduits within the base member and latch support member.

12. A pipe-laying stinger assembly for use with a pipe-laying barge, comprising:
an elongate support member, adapted to be attached to the barge, and having a plurality of rollers thereon for supporting a length of pipe:
a mounting member secured to said support member;
a base member having at least one upwardly extending conduit and a locking plate supported thereon, said conduit adapted for containing fluid or electrical control lines, and said base member being secured to the mounting member;
a latch support member including at least one downwardly extending conduit and having a locking mandrel depending therefrom, said conduit being adapted to be connected to the pipe-laying barge;
means for moving said locking mandrel downwardly through said locking plate; and
means for rotating in a first direction said locking mandrel into locking engagement with said locking plate, said means for rotating being mounted on the latch support member, whereby the at least two conduits are releasably connected by the engagement of the locking mandrel with the locking plate.

13. The pipe-laying stinger assembly of claim 12, wherein the means for rotating the locking mandrel comprises a piston, having upper and lower ends, and a hydraulic cylinder mounted on the latch support member, the piston being operatively associated with the locking mandrel, whereby upon selective actuation of said piston within the cylinder, the locking mandrel is either rotated in a first direction into engagement with the locking plate or rotated in a second direction out of engagement with the locking plate to allow the conduit connected to the pipe-laying barge to be disconnected from the pipe-laying stinger.

14. The pipe-laying stinger assembly of claim 13, wherein one of the ends of the piston includes guide means comprising a straight splined shaft and a mating straight splined surface, whereby upon movement of the piston, undesired rotational movement of the latching mandrel is prevented by the straight splined shaft and the mating straight splined shaft.

15. The pipe-laying stinger assembly of claim 14, wherein the straight splined shaft is disposed at the lower end of the piston, and an emergency disconnected means is disposed at the upper end of the piston, whereby upon a failure associated with the hydraulic cylinder occurring, the emergency disconnect means may be remotely activated to move the piston upwardly to rotate the locking mandrel out of engagement with the locking plate.

16. The pipe-laying stinger assembly of claim 13, wherein the means for rotating the locking mandrel further comprises a spirally splined shaft and a mating spirally splined surface operatively associated with the locking mandrel, whereby movement of the spirally splined shaft rotates the mating splined surface and locking mandrel.

17. The pipe-laying stinger assembly of claim 16, wherein the spirally splined surface comprises a ring, having spiral splines on its interior surface, secured to the locking mandrel.

18. The pipe-laying stinger assembly of claim 17, wherein the ring is secured to the locking mandrel by at least one key which mates with at least one keyway disposed on the locking mandrel.

19. The pipe-laying stinger assembly of claim 16, wherein the spirally splined shaft is secured to the lower end of the piston, whereby upon downward movement of the piston, the spirally splined shaft also moves downwardly and rotates the mating spirally splined surface and the locking mandrel.

20. The pipe-laying stinger assembly of claim 19, wherein the spirally splined surface comprises a ring secured to the locking mandrel, the ring having spiral splines on its interior surface.

21. The pipe-laying stinger assembly of claim 12, wherein said at least two conduits have at least one key which mates with a corresponding keyway for aligning the conduits in the base member and in the latch support member, which key and keyway prevent rotational movement of the conduits within the base member and latch support member.

* * * * *